United States Patent
Fran et al.

(10) Patent No.: US 6,774,548 B2
(45) Date of Patent: Aug. 10, 2004

(54) CARBON NANOTUBE FIELD EMISSION DISPLAY

(75) Inventors: Yui-Shin Fran, Hsinchu (TW); Lai-Cheng Chen, Hsinchu (TW)

(73) Assignee: Delta Optoelectronics, Inc., Hsin-chu (TW)

(*) Notice: Subject to any disclaimer, the term of this patent is extended or adjusted under 35 U.S.C. 154(b) by 105 days.

(21) Appl. No.: 10/011,281

(22) Filed: Dec. 11, 2001

(65) Prior Publication Data

US 2003/0030356 A1 Feb. 13, 2003

(30) Foreign Application Priority Data

Aug. 13, 2001 (TW) .................................. 90119797 A (51) Int. Cl.⁷ ................................................ H01J 1/30
(52) U.S. Cl. ...................... 313/309; 313/311; 313/497; 313/336; 313/351
(58) Field of Search ................. 313/309–311, 495–497, 313/336, 351

(56) References Cited

U.S. PATENT DOCUMENTS

| | | | | |
|---|---|---|---|---|
| 5,534,749 A | * | 7/1996 | Ohoshi et al. | 313/497 |
| 5,552,659 A | * | 9/1996 | Macaulay et al. | 313/310 |
| 5,588,893 A | * | 12/1996 | Kaftanov et al. | 445/6 |
| 5,717,287 A | * | 2/1998 | Amrine et al. | 313/495 |
| 5,872,422 A | * | 2/1999 | Xu et al. | 313/311 |
| 6,097,138 A | * | 8/2000 | Nakamoto | 313/309 |
| 6,250,984 B1 | * | 6/2001 | Jin et al. | 445/51 |
| 6,297,592 B1 | * | 10/2001 | Goren et al. | 315/3.5 |
| 6,440,761 B1 | * | 8/2002 | Choi | 438/20 |
| 6,448,701 B1 | * | 9/2002 | Hsu | 313/309 |
| 6,504,292 B1 | * | 1/2003 | Choi et al. | 313/310 |
| 6,515,415 B1 | * | 2/2003 | Han et al. | 313/496 |

* cited by examiner

Primary Examiner—Alan Cariaso
Assistant Examiner—Dalei Dong
(74) Attorney, Agent, or Firm—Birch, Stewart, Kolasch & Birch, LLP (57) ABSTRACT

A carbon nanotube (CNT) field emission display has a cathode substrate having a cathode layer patterned on a glass substrate. The surface of the cathode layer is defined as a plurality of electron-emitting areas apart from each other, and a plurality of CNT structures is grown on the plurality of electron-emitting areas respectively.

10 Claims, 6 Drawing Sheets

CARBON NANOTUBE FIELD EMISSION DISPLAY

BACKGROUND OF THE INVENTION

1. Field of the Invention

The present invention relates to a field emission display (FED) and, more particularly, to a carbon nanotube field emission display (CNT-FED).

2. Description of the Related Art

Filed emission display (FED), having competitiveness in the panel display market, is a high-voltage display with a triode structure consisting of anode, cathode and gate electrode to achieve high illumination by applying a high voltage and a low current. FED has advantages of light weight and thin profile, like liquid crystal display (LCD), and advantages of high brightness and self luminescence, like cathode ray tube (CRT). In conventional FED processing, fluorescent material is formed on an anode substrate, an electron-emitting source with a discharge tip is formed on a cathode substrate, and a gate electrode is formed to surround the discharge tip. Thus, applying a high electric field generated from the gate electrode, electrons are released from the discharge tip and then the electrons are accelerated by applied high voltage to strike the fluorescent material, resulting in emitted cathode fluorescence. With regard to the fabrication of the electron-emitting source, molybdenum (Mo) metal is employed to form a micro-tip shape, despite attendant problems of complex process, expensive equipment cost and low throughput.

Figure 1:
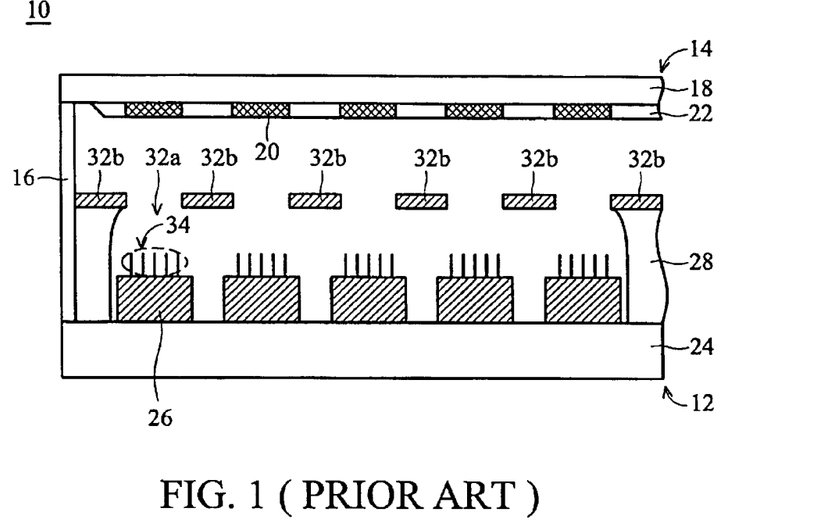
FIG. 1 is a sectional diagram showing a primitive CNT-FED.

Recently, carbon nanotube (CNT) materials, having high mechanical strength and great electrical performance, have been used to form the electron-emitting source of FED. Since simple and low cost technologies, such as screen printing, chemical vapor deposition (CVD) and coating, are applied to coat/grow carbon nanotubes within an electron-emitting area, the product, CNT-FED, has high throughput and may be formed as a large-size display. FIG. 1 is a sectional diagram showing a primitive CNT-FED 10. The CNT-FED 10 has a cathode substrate 12, an anode substrate 14 over and parallel to the cathode substrate 12, a spacer 16 disposed in the vacuum space between the two substrates 12 and 14 for maintaining a predetermined vertical distance and resisting atmosphere pressure. The anode substrate 14 has a glass substrate 18, a plurality of fluorescent layers 20 patterned on predetermined regions of the glass substrate 18, and planarized Al film 22 formed on the exposed regions of the glass substrate 18. The first purpose of the Al film 22 is to serve as a conductive layer of the anode substrate 14, the second purpose is to serve as a reflective layer of the fluorescent layer 20, and the third purpose is to serve as a protective layer for protecting the fluorescent layer 20 from ion bombardment and electric-filed attraction. The cathode substrate 12 has a glass substrate 24, a plurality of cathode layers 26 patterned on predetermined regions of the glass substrate 24, a plurality of CNT structures 34 grown on each electron-emitting area of the cathode layer 26, an insulating layer 28 formed on peripheral region of the glass substrate 24, and a net-shaped metal layer 32 glued on the insulating layer 28 by frit. In addition, each opening 32a of the net-shaped metal layer 32 corresponds to each electron-emitting area of the cathode layer 26, thus the metal material of the net-shaped metal layer 32 surrounding the cathode layer 26 serves as a gate electrode 32b.

However, the CNT-FED 10 has disadvantages. First, edge effect is found at the outer carbon nanotubes that surround the electron-emitting area, thus each fluorescent layer 20 emits a comparatively brighter light at periphery and a comparatively darker light at the center. This causes non-uniform luminescence and decreases luminescent property of the CNT-FED 10. Second, since only the edge of the net-shaped metal layer 32 is glued to the insulating layer 28 that is formed on the peripheral region of the cathode substrate 12, most of the gate electrodes 32b are suspended over the cathode substrate 12. As the size of the net-shaped metal layer 32 is increased, the center area of the net-shaped metal layer 32 easily droops and become uneven. This causes electrons to bombard the gate electrode 32 and forms non-uniform electric fields, which may vibrate the gate electrode 32 or even peel the net-shaped metal layer 32. Third, when removing organic materials at high temperature, preferably at 450~500° C., part of the Al film 22 may be oxidized to become aluminum oxide, resulting in a decreased conductivity of the Al film 22. This leads to an accumulation of charges when electrons are emitted to bombard the anode substrate 14. Also, when the charges are accumulated to reach a critical amount, an arc phenomenon is formed in order to deplete the accumulated charges, and thus the brightness on the anode substrate 14 is burned out. Moreover, the accumulated charges may generate a repellent electric field that makes the subsequently emitted electrons unable to bombard the anode substrate 14. This decreases the electron quantities that bombard the anode substrate 14 and degrades the brightness that is emitted from the fluorescent layer 20. Fourth, no matter whether the electron-emitting source employs a metal tip or the CNT structure 34, a divergent phenomenon of the electrons is always found to cause cross-talk on the anode substrate 14. Furthermore, as the amount of emitted electrons is greater, the excessive electrons directly bombard the anode substrate 14 to generate a spark. Thus, a novel structure of the CNT-FED and an improved process of forming the same to solve the aforementioned problems are called for.

SUMMARY OF THE INVENTION

The present invention provides a CNT-FED with a novel cathode substrate and a novel anode substrate to solve the problems caused by prior art.

The carbon nanotube (CNT) field emission display has a cathode substrate having a cathode layer patterned on a glass substrate. The surface of the cathode layer is defined as a plurality of electron-emitting areas apart from each other, and a plurality of CNT structures is grown on the plurality of electron-emitting areas respectively.

A method of forming a cathode substrate comprises: providing a glass substrate on which a plurality of cathode layers are patterned; forming a plurality of ribs in each space between adjacent cathode layers, wherein the rib protrudes from the top of the cathode layer to reach a predetermined height; printing to form a net-shaped gate electrode layer on the plurality of ribs; and performing high-temperature baking.

The CNT-FED has an anode substrate with a plurality of fluorescent layers patterned on a glass substrate. A planarized Al film covers the fluorescent layers, and a metal sheet covers the Al film. The metal sheet has a plurality of openings, wherein the openings are corresponding to the fluorescent layers respectively.

The CNT-FED has a cathode substrate with a plurality of cathode layers patterned on a glass substrate, wherein each cathode layer has an electron-emitting area on which a CNT structure is formed. A plurality of ribs fills each space between adjacent cathode layers and each rib protrudes from the top of the cathode layer to reach a predetermined height. A net-shaped gate electrode layer is formed on the plurality of ribs, and a metal cap covers the gate electrode layer. The metal cap has a plurality of apertures, wherein the plurality of apertures is corresponding to the electron-emitting areas respectively.

Accordingly, it is a principle object of the invention to provide the metal sheet to prevent arc phenomenon.

It is another object of the invention to protect the gate electrode layer from vibrating and peeling.

Yet another object of the invention is to increase the luminescent uniformity and luminescent efficiency of the CNT-FED.

It is a further object of the invention to provide the metal cap to avoid cross-talk on the anode substrate.

Still another object of the invention is to provide the apertures on the metal cap to limit the emitting space of the direct-emitting electrons; thereby decreasing the amount of accumulated electrons is decreased to eliminate arcing.

These and other objects of the present invention will become readily apparent upon further review of the following specification and drawings.

BRIEF DESCRIPTION OF THE DRAWINGS

FIGS. 2C and 2D are top views showing an electron-emitting area according to the first embodiment of the present invention.

Similar reference characters denote corresponding features consistently throughout the attached drawings.

DETAILED DESCRIPTION OF THE PREFERRED EMBODIMENTS

[First Embodiment]

Figure 2A:
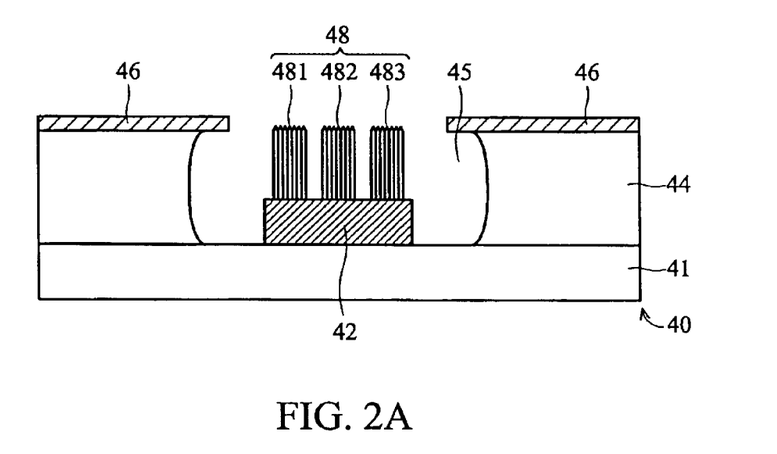
FIG. 2A is a sectional diagram showing a cathode substrate of CNT-FED according to the first embodiment of the present invention.
Figure 2B:
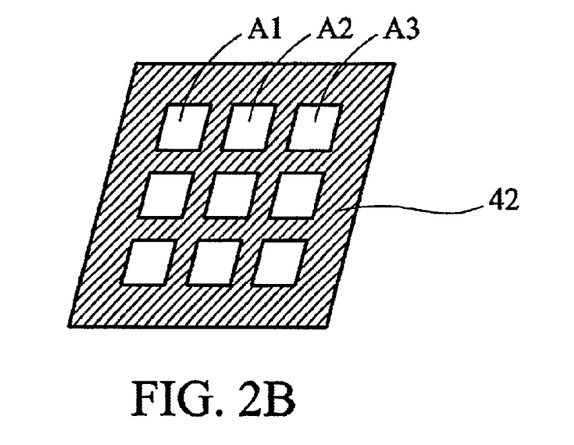
FIG. 2B is a top view showing an electron-emitting area according the prior art.
Figure 2D:
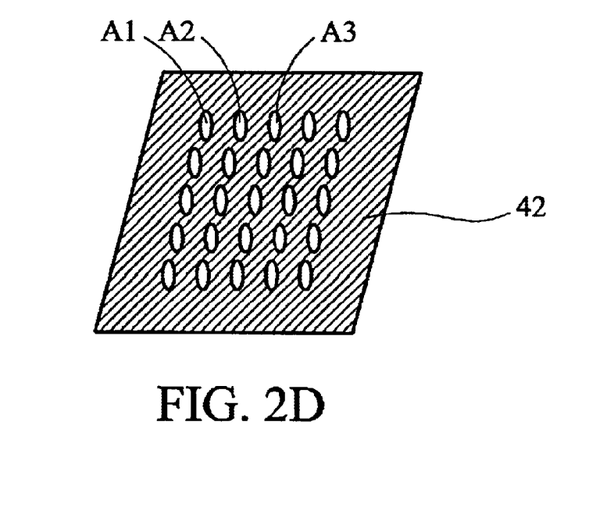

Please refer to FIGS. 2A to 2D. FIG. 2A is a sectional diagram showing a cathode substrate of CNT-FED according to the first embodiment of the present invention. FIG. 2B is a top view showing an electron-emitting area according to the prior art. FIGS. 2C and 2D are top views showing an electron-emitting area according to the first embodiment of the present invention. As shown in FIG. 2A, in the first embodiment of cNT-FED, a cathode substrate 40 comprises a glass substrate 41, a plurality of cathode layers 42 patterned on predetermined regions of the glass substrate 41, an insulating layer 44 formed in the space between adjacent cathode layers 42, a plurality of openings 45 passing through the insulating layer 44 to expose each cathode layer 42, a net-shaped gate electrode layer 46 formed on the insulating layer 44 without covering the openings 45, and a plurality of CNT structures 48. Each of the CNT structures 48 is grown on an electron-emitting area of each cathode layer 42, and each CNT structure 48 has a plurality of sub-CNT structures 481, 482 and 483 that are apart from each other and arranged in array. It is noted that the sub-CNT structures 481, 482 and 483 are spaced apart from each other without forming an insulating layer therebetween.

As shown in FIG. 2B, in the prior art, an electron-emitting area A is filled with carbon nanotubes and thus some of the carbon nanotubes grown at the periphery of the area A always cause edge effect, decreasing the luminescent uniformity of the CNT-FED. In order to solve this problem, in the first embodiment, the electron-emitting area A is divided into a plurality of sub-areas on which each sub-CNT structure is grown. As shown in FIGS. 2C and 2D, the area A is divided into sub-areas A1, A2 and A3 that are uniform and apart from each other and arranged in array, and the sub-CNT structures 481, 482 and 483 are grown on the sub-areas A1, A2 and A3 respectively. It is noted that the sub-areas A1, A2 and A3 are spaced apart from each other without forming an insulating layer therebetween. Since edge effect is formed at the periphery of each sub-area A1, A2 and A3, the combination of all edge effects can improve the luminescent uniformity of the CNT-FED. Also, as the size of the sub-area is decreased, the interval between adjacent sub-areas is reduced, and the distribution of the sub-areas is denser, the brightness and luminescent uniformity of the CNT-FED are increased.

In addition, depending on process requirements and limitations, the profile of the sub-areas A1, A2 and A3 is a design choice. Preferably, the profile of the sub-area may be quadrilateral, circular or any other physical appearance. In fabricating the CNT structure 48, printing is preferred used to coat CNT materials on the sub-areas A1, A2 and A3. Preferably, the interval between adjacent sub-areas is 80–150 $\mu m$, and the size of the sub-area is 200×200 $\mu m^2$.

[Second Embodiment]

Figure 3A:
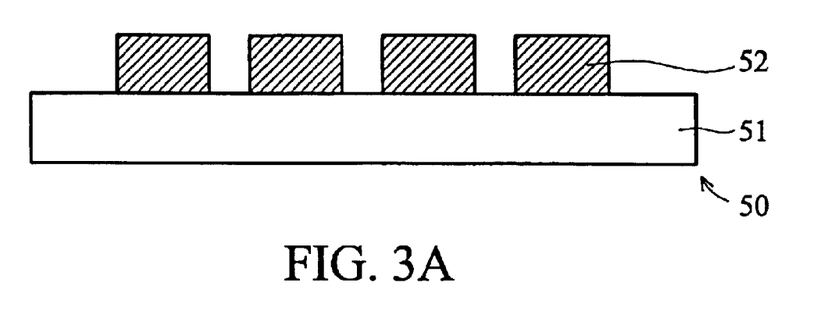
FIGS. 3A to 3C are sectional diagrams showing a method of forming a gate electrode layer according to the second embodiment of the present invention.
Figure 3B:
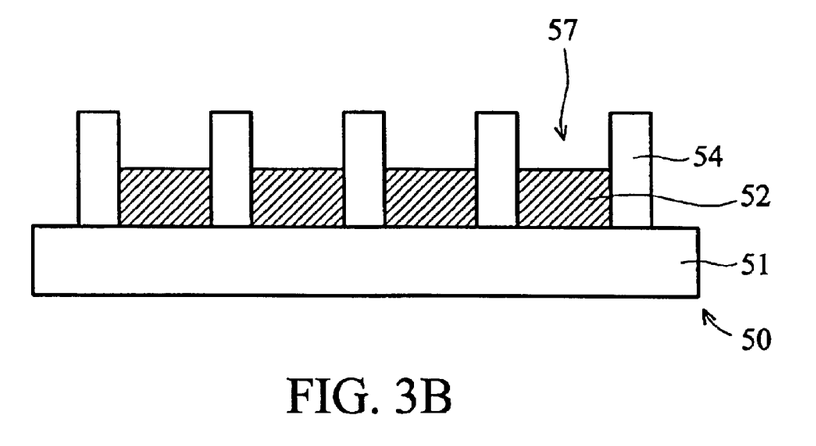
Figure 3C:
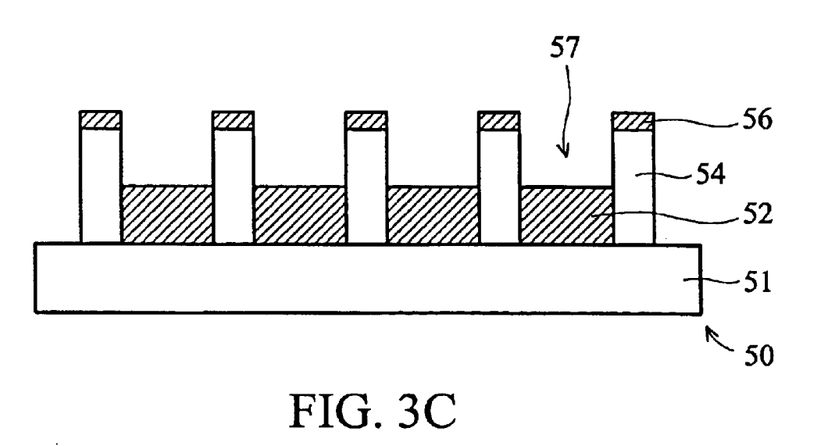

FIGS. 3A to 3C are sectional diagrams showing a method of forming a gate electrode layer according to the second embodiment of the present invention. The second embodiment provides a method of forming a gate electrode layer on a cathode substrate 50 of CNT-FED. As shown in FIG. 3A, using deposition and photolithography/printing, a plurality of cathode layers 52 is patterned on a glass substrate 51. The cathode layer 52 is selected from Ag, Cu or other conductive metal materials. Then, as shown in FIG. 3B, using deposition and photolithography/printing, a plurality of ribs 54 is formed to fill the space between adjacent cathode layers 52 and protrude the top of the cathode layers 52, resulting in a plurality of cavities 57 over the cathode layers 52 respectively. Preferably, the thickness of the rib 54 is 30–100 $\mu m$. Next, as shown in FIG. 3C, using printing, a plurality of gate electrode layers 56 is formed on each top of the ribs 54. The gate electrode layer 56 is selected from Ag, Cu or other conductive metal materials. Thereafter, high-temperature baking is used for the rib 54 and the gate electrode layers 56.

Compared with the prior method of forming a net-shaped metal layer, each of the gate electrode layers 56 formed on each top of the ribs 54 cannot droop or become uneven. This prevents the gate electrode layer 56 from vibrating and peeling, and thus improves the luminescent uniformity and luminescent efficiency of the CNT-FED. In addition, in the subsequent process of forming a CNT structure on the cathode layer 52, the CNT structure can be formed on the whole electron-emitting area A by using CVD as shown in FIG. 2B. Alternatively, coordinating the first embodiment, sub-CNT structures can be formed on each sub-area A1, A2 and A3 as shown in FIGS. 2C and 2D. In another case, the CNT structure can be printed before the formation of the ribs 54 by using screen printing, and then the gate electrode layers 56 are formed on the ribs 54 by using printing. Next, high-temperature baking can be used for the multilayer.

[Third Embodiment]

Figure 4A:
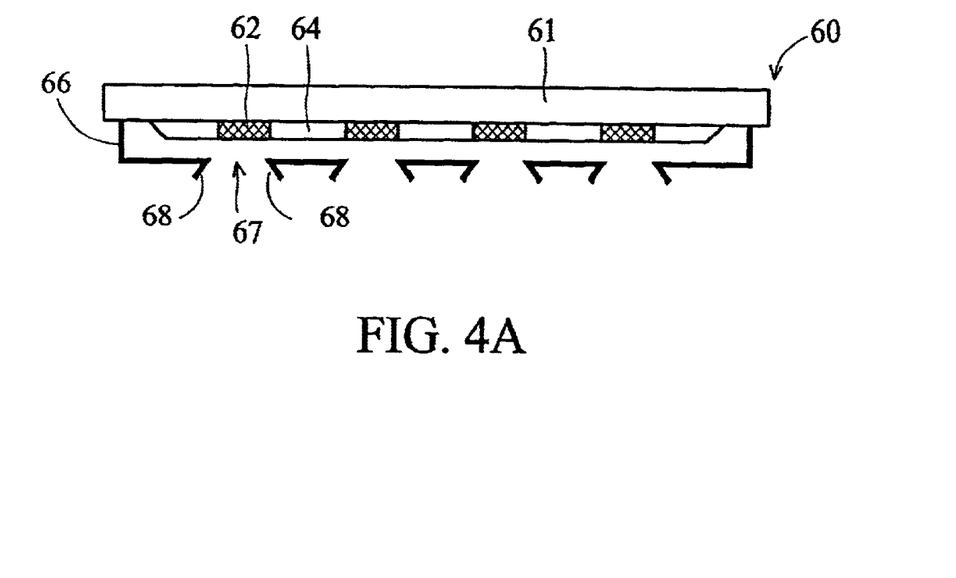
FIGS. 4A and 4B are sectional diagrams showing an anode substrate of CNT-FED according to the third embodiment of the present invention.
Figure 4B:
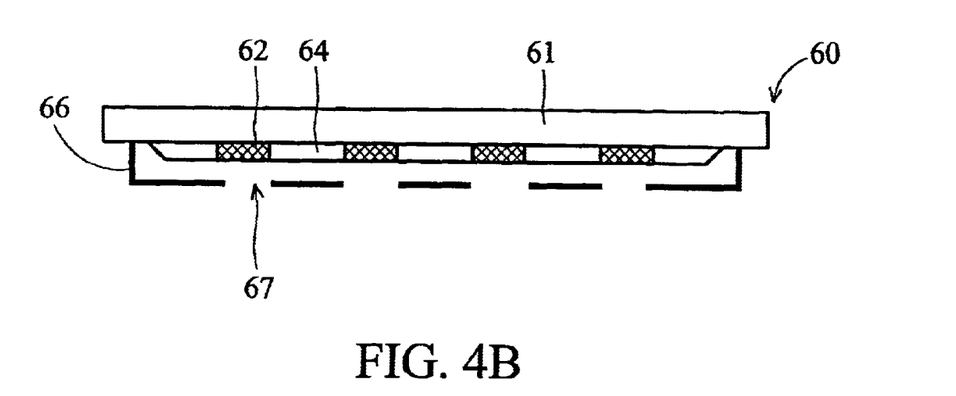

FIGS. 4A and 4B are sectional diagrams showing an anode substrate of CNT-FED according to the third embodiment of the present invention. In the third embodiment, an anode substrate 60 is provided with a glass substrate 61, a plurality of fluorescent layers 62 patterned on predetermined regions of the glass substrate 61, and a planarized Al film 64 covering the fluorescent layers 62 and the exposed glass substrate 61. In addition, a metal sheet 66 glued to the glass substrate 61 by frit covers the Al film 64 and has a potential the same as the Al film 64. Preferably, the metal sheet 66 and the Al film 64 are spaced out a predetermined distance apart. In order to make electrons bombard the fluorescent layers, the metal sheet 66 has a plurality of openings 67 corresponding to the fluorescent layers respectively. Also, in order to block the scattering electrons, two metal feet 68 bent outside the opening 67 are provided, as shown in FIG. 4A. This leads electrons to directly bombard the fluorescent layer 62 to prevent cross-talk on the anode substrate 60.

Although part of the Al film 64 may be oxidized when removing organic materials at high temperature (450–500° C.), the metal sheet 66 can compensate conductivity for the Al film 64 to prevent an arc phenomenon generated by the accumulated of electrons.

[Fourth Embodiment]

Figure 5A:
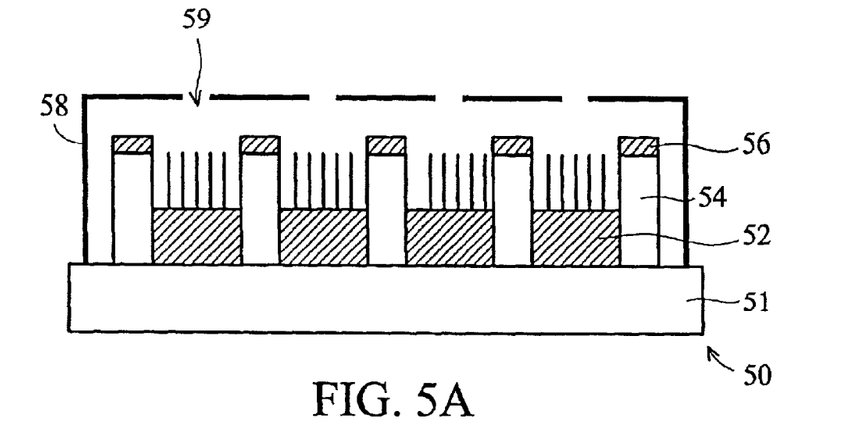
FIG. 5A is a sectional diagram showing a cathode substrate according to the fourth embodiment of the present invention.
Figure 5B:
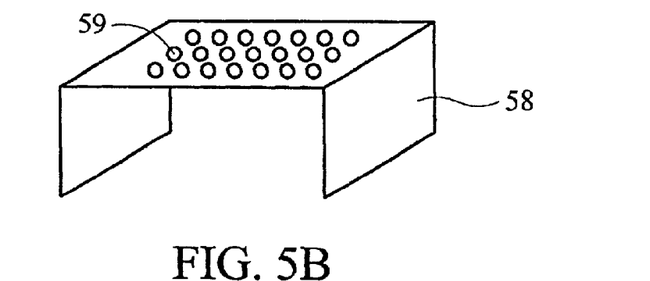
FIGS. 5B to 5D are three-dimensional diagrams showing a metal cap according to the fourth embodiment of the present invention.
Figure 5C:
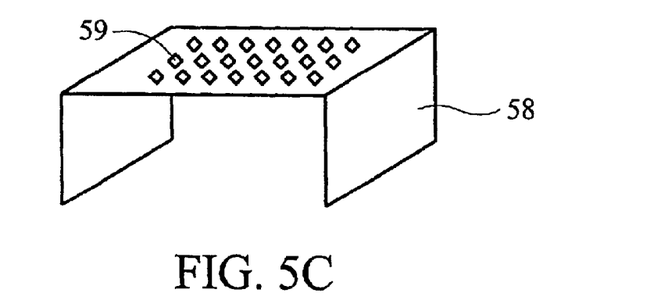
Figure 5D:
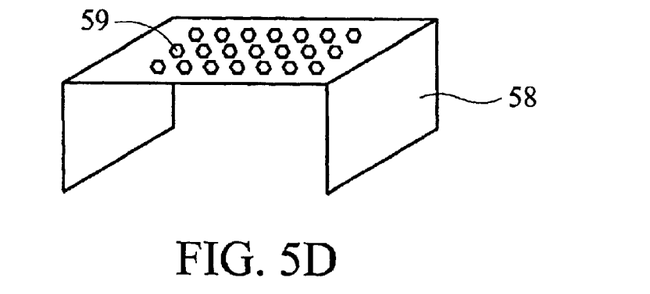

In order to prevent the divergent phenomenon from causing cross-talk on the anode substrate, the fourth embodiment provides a metal cap to cover the completed cathode substrate for blocking scattering electrons. FIG. 5A is a sectional diagram showing a cathode substrate according to the fourth embodiment of the present invention. FIGS. 5B to 5D are three-dimensional diagrams showing a metal cap according to the fourth embodiment of the present invention. As shown in FIG. 5A, using the cathode substrate 50 on which the gate electrode layers 56 are formed according to the second embodiment, the CNT structures are formed on the cathode layers 52 respectively and a metal cap 58 is employed to mask the surface of the cathode substrate 50. The metal cap 58 has a plurality of apertures 59 corresponding to the electron-emitting areas respectively and corresponding to the fluorescent layers respectively. The metal cap 58 and the gate electrode layer 56 have an equal potential and are spaced out a predetermined distance apart, preferably 0.1~1 mm. The gate electrode layer 56 is used to attract emitted electrons, and the metal cap 58 is used to focus the electron beam. Since an electric field generated by the metal cap 58 is smaller than another electric field generated by the gate electrode layer 56, the excessive electrons cannot bombard the metal cap 58 to cause vibration. Also, since the scattering electrons are blocked and guided outside by the metal cap 58, the cross-talk on the anode substrate is avoided. Furthermore, the apertures 59 limit the emitting space of the direct-emitting electrons, therefore the amount of the accumulated electrons is decreased to eliminate arc phenomenon.

Preferably, the diameter of the aperture 59 is 300~600 μm, and the distance between adjacent apertures 59 is 100~200 μm. The profile of the aperture 59 is a design choice. As the size of the aperture 59 is increased, the current of the direct-emitting electrons is increased. Preferably, the profile of the aperture 59 is circular as shown in FIG. 5B, quadrilateral as shown in FIG. 5C, or hexagon as shown in FIG. 5D that achieves the lager size.

[Fifth Embodiment]

Figure 6:
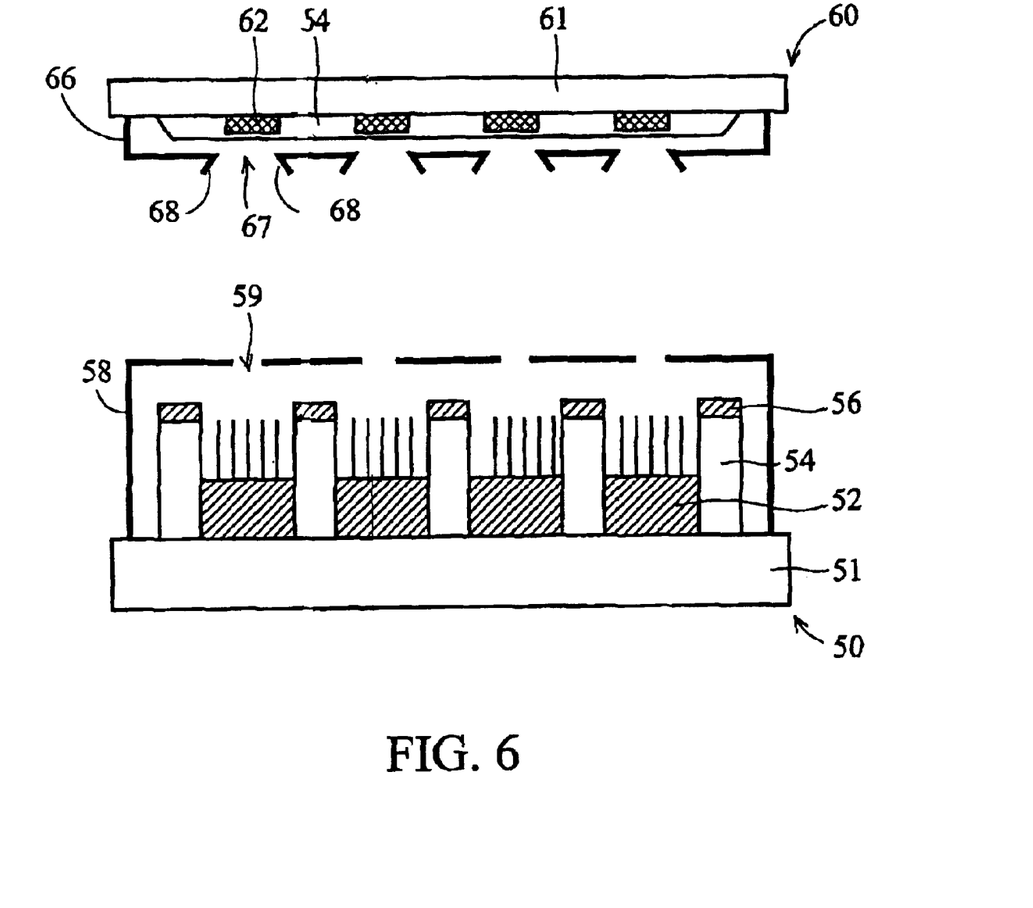
FIG. 6 is a sectional diagram showing a CNT-FED according to the fifth embodiment of the present invention.

FIG. 6 is a sectional diagram showing a CNT-FED according to the fifth embodiment of the present invention. The fifth embodiment provides a CNT-FED that is the combination of the anode substrate 60 shown in FIG. 4A and the cathode substrate 50 shown in FIG. 5A. Using the metal foot 68 and the apertures 59, the CNT-FED can further prevent the cross-talk on the anode substrate 60.

It is to be understood that the present invention is not limited to the embodiments described above, but encompasses any and all embodiments within the scope of the following claims.

What is claimed is:

1. A carbon nanotube (CNT) field emission display, comprising:

a first glass substrate;

a plurality of fluorescent layers formed overlying the first glass substrate;

a planarized Al film formed overlying the fluorescent layers; and a metal sheet glued to the first glass substrate and shielding the Al film;

the metal sheet including a plurality of openings corresponding to the fluorescent layers respectively; and a plurality of metal feet bent outside the metal sheet; wherein, each opening of the metal sheet is surrounded by two metal feet.

2. The carbon nanotube (CNT) field emission display according to claim 1, further comprising:

a second glass substrate opposite to the first glass substrate;

a plurality of cathode layers formed overlying the second glass substrate, wherein each cathode layer includes a plurality of electron-emitting areas spaced apart from each other; and a plurality of CNT structures grown on the cathode layers respectively, wherein each CNT structure comprises a plurality of sub-CNT structures spaced apart from each other;

the plurality of sub-CNT structures being grown on the plurality of electron-emitting areas.

3. The carbon nanotube (CNT) field emission display according to claim 2, wherein the electron-emitting areas are uniform and arranged in an array.

4. The carbon nanotube (CNT) field emission display according to claim 2, wherein the interval of two adjacent electron-emitting areas is 80~150 μm.

5. The carbon nanotube (CNT) field emission display according to claim 2, wherein the profile of the electron-emitting area is quadrilateral, circular or any other physical appearance.

6. The carbon nanotube (CNT) field emission display according to claim 2, further comprising:
- a plurality of ribs formed overlying the second glass substrate and filling a space between two adjacent cathode layers, wherein the rib protrudes from the top of the cathode layer to reach a predetermined height;
- a net-shaped gate electrode layer formed overlying the plurality of ribs; and
- a metal cap glued to the second glass substrate and shielding the gate electrode layer;
- wherein, the metal cap comprises a plurality of apertures corresponding to the plurality of electron-emitting areas respectively.

7. The carbon nanotube (CNT) field emission display according to claim 6, wherein the diameter of the aperture is 300~600 µm.

8. The carbon nanotube (CNT) field emission display according to claim 6, wherein the profile of the aperture is circular.

9. The carbon nanotube (CNT) field emission display according to claim 6, wherein the profile of the aperture is quadrilateral.

10. The carbon nanotube (CNT) field emission display according to claim 6, wherein the profile of the aperture is hexagonal.

* * * * *